May 14, 1968 H. R. WEBER ET AL 3,383,190
FUEL BLENDING SYSTEM
Filed Nov. 23, 1962 4 Sheets-Sheet 1

INVENTORS
HARRY R. WEBER
HERMAN F. HOFFMANN
BY
*Oswald G. Hayes*
ATTORNEYS

H. R. WEBER ET AL 3,383,190

FUEL BLENDING SYSTEM

Filed Nov. 23, 1962

INVENTORS
HARRY R. WEBER
HERMAN F. HOFFMANN
BY
*Oswald F. Hayes*
ATTORNEYS

United States Patent Office 3,383,190
Patented May 14, 1968

3,383,190
FUEL BLENDING SYSTEM
Harry R. Weber, Haddon Township, Camden County, and Herman F. Hoffmann, Wenonah, N.J., assignors to Mobil Oil Corporation, a corporation of New York
Filed Nov. 23, 1962, Ser. No. 239,505
The portion of the term of the patent subsequent to Mar. 8, 1983, has been disclaimed
4 Claims. (Cl. 44—2)

This invention relates to the blending of an automotive fuel product and, more particularly, to the batch blending of a gasoline so that it meets a predetermined specification regarding octane number.

In the batch blending of gasoline, the bulk components thereof are typically applied one by one or in partial combination to a mixing tank to produce a finished blend of gasoline only after a complete mixing of the components in the tank accompanied by the addition of a non-bulk anti-knock agent such as tetraethyl lead (TEL), for example. During the mixing operation, the gasoline is repeatedly sampled and tested to determine its octane number, and the addition of the anti-knock agent is controlled in accordance therewith.

Heretofore the determination of octane number has involved a rather cumbersome procedure. Specifically, at predetermined intervals during the mixing operation, a sample is withdrawn from the blending tank and conveyed by hand to a laboratory in which the standard ASTM-CFR knock testing engine is utilized to test the gasoline and to determine its octane number. Information regarding the octane number is relayed to an operator at the blending tank and the amount of anti-knock agent added to the blend is controlled in accordance therewith to bring the blend to octane number specification.

As may be noted, this procedure involves a number of time consuming manual operations. Thus, the batch blending of fuel proceeds inefficiently, with corrections being made well after specification deviations are noted and with the product approved for shipment only after repeated testing.

Recently, however, the techniques involved in the monitoring of a gasoline to determine its octane number have been greatly improved, so that there are now available for use highly developed and reliable automatic octane monitors. Such automatic monitors are disclosed in the copending applications of William E. Beal and Alfred E. Traver, Ser. Nos. 160,051, now U.S. Patent No. 3,238,765 and 160,052, now U.S. Patent No. 3,312,102, respectively, both filed Dec. 18, 1961, for "Apparatus for Determining the Combustion Quality of a Fuel," and "Automotive Engine for Determining the Combustion Quality of a Fuel," respectively, both of which have a common assignee with the instant application.

Such improved octane number monitors lend themselves to the automatic blending of automotive fuels. Accordingly, the present invention is directed towards the automatic monitoring and blending of a gasoline in a batch blending operation in accordance with the octane number of the blended fuel. This is accomplished in an illustrative embodiment of the present invention by an octane number monitor which continuously monitors the batch of gasoline being blended in the blending tank and which develops a continuous signal representative of the octane number of the batch. This signal is applied to a computer which compares with a reference signal that represents the octane number desired for the finished blend of gasoline in the tank. An error signal is thus generated which is used to develop an output signal for controlling a factor in the blend so as to produce the desired octane number for the particular blend.

The output signal from the computer is applied to an eductor which controls the amount of a variable such as an anti-knock agent (TEL, for example) that is introduced into the blending tank. After a suitable time during which the newly added anti-knock agent is completely intermixed with the gasoline in the tank, which is advantageously determined by noting that signals from the octane number monitor are substantially constant for a predetermined period of time, the computer analyzes the signals from the octane number monitor to determine if the blend is meeting octane number specification. If the blend is still off-specification, the process just described is repeated again and more anti-knock agent is added to the blend of gasoline. This procedure is repeated until the blend meets specification, at which time the blend is ready for shipping.

To ensure that the blend is brought properly to specification, the computer includes a feature that limits the amount of anti-knock agent that may be applied to the blending tank in a particular step so that only a partial correction is made for the deviation in octane number of the blend of gasoline from that desired. In this fashion, corrections are made in at least two successive steps and the blend is gradually brought to specification, thereby guarding against the addition of too much anti-knock agent to the blend involving costly quality give-away.

In addition, a positive feature of protection is provided to prevent the addition of more than a predetermined total amount of anti-knock agent per gallon of gasoline in the blending tank. This is in accordance with regulations established by state and local authorities which limit the amount of anti-knock agent per gallon that may be present in any blend of gasoline mixture adapted for commercial or private use.

A detailed description follows of one embodiment of the invention described generally above, which is to be read in conjunction with the appended drawings in which.

Figure 1:
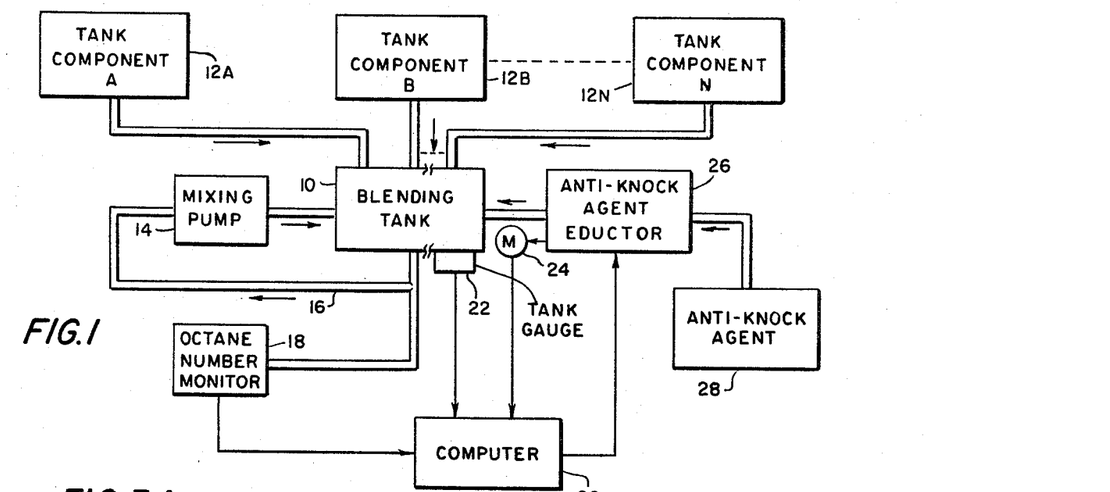
FIG. 1 is a block diagram of a batch blending system in accordance with the present invention.

Referring to FIG. 1, a blending tank 10 is shown to which are applied a plurality of bulk fuel components such as bulk gasoline components A, B . . . N or other full substances from a plurality of component sources 12A, 12B . . . 12N. Within the blending tank 10, predetermined amounts of the components A, B . . . N are mixed or blended together to form a full product such as blended gasoline which is circulated by a mixing pump 14 through a conduit 16. An octane number monitor or sensing means 18, which may be either of the monitors shown in the copending Beal and Traver applications referred to above, receives a sample of the gasoline in the conduit 16 and generates a signal representative of the octane number of that sample.

The octane number signal is applied to a computer 20 which also receives a signal from a tank gauge 22 on the blending tank 10 indicative of the total gallonage of gasoline present in the blending tank. The computer 20 also receives a signal from a meter 24 which is coupled to control means such as an anti-knock agent eductor 26 that applies a non-bulk anti-knock agent such as TEL, for example, to the blending tank 10 from a source 28. The signal from the meter 24 is typically representative of the total amount of anti-knock agent that has been added to the blending tank 10.

Within the computer 20 the signals from the octane number monitor 18, the tank gauge 22, and the meter 24 are combined to produce an output signal which is applied to the anti-knock agent eductor 26 to vary the amount of anti-knock agent that is applied to the blending tank 10 from the source 28. Specifically, the computer determines the amount of anti-knock agent that should be added to the mixture to bring the mixture almost entirely up to octane number specification and controls the eductor 26 so that this amount is added to the blending tank.

After the gasoline in the blending tank and the newly added concentration of anti-knock agent have been thoroughly intermixed, which is advantageously determined by analysis of the signals from the octane number monitor 18 to detect that the signals are substantially constant for a predetermined time interval, the computer repeats the above procedure to determine if a further change is necessary in the anti-knock agent concentration in the blending tank. If such is required, a signal is again generated which is applied to the anti-knock agent eductor 26 to add a further amount of anti-knock agent to the blending tank.

In this fashion, in a plurality of continuing computations and control cycles, the computer 20 varies the amount of anti-knock agent that is added to the blending tank until the gasoline within the tank is brought to octane number specification, at which time the product is ready for shipping.

Figure 2:
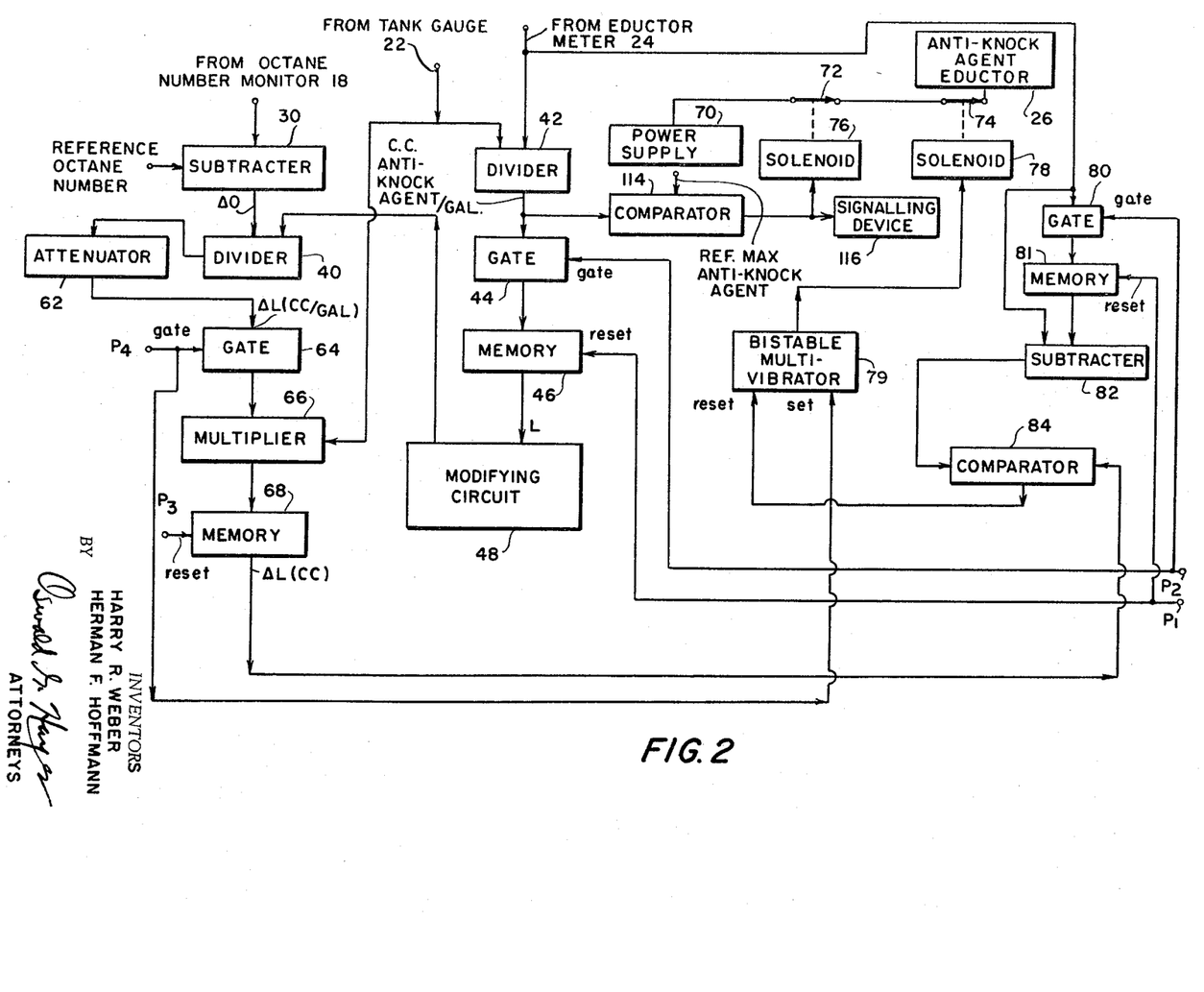
FIG. 2 is a block diagram showing in detail a representative computer that may be employed in the system of FIG. 1.

FIG. 2 shows in detail a representative computer 20 that may be used in the system of FIG. 1. Before considering the circuit itself, however, the general theoretical relationships regarding the blending of fuel in accordance with octane number will be developed.

For any blended fuel the susceptibility of the fuel to anti-knock agent, i.e., the relationship between the octane number of the blended fuel and the amount of anti-knock agent present in the blend, may be expressed by the following relation:

$$O = O° + a + bL + cL^2 + dL^3 + eL^4 \quad (1)$$

where $O$ is the octane number of the blended fuel; $O°$ is the octane number of the blended fuel with no anti-knock agent present in the mixture; $L$ is the amount of anti-knock agent present in the mixture, typically expressed in cubic centimeters (cc.) per gallon; and $a$, $b$, $c$, $d$ and $e$ are predetermined constants.

As may be noted relation (1) assumes that the effect of the anti-knock agent upon octane number may be expressed by a polynomial expansion with fixed coefficients. This assumption is permissible within the context of the present system, since that system is one which is in continuous adjustment tending to reduce to zero any deviation from specification of the octane number of the blended fuel. If any error is introduced as a result of this assumption, it will tend to have no effect as the system adjusts the amount of anti-knock agent added to the blended fuel to satisfy the specification; the only effect is on the response of the system, i.e., the time taken to bring a blended fuel to octane number specification.

Since the octane number of the blended fuel without any anti-knock agent present is a constant for any particular mixture in the blending tank 10, Relation 1 may be differentiated to give the following relation which expresses the relationship between a change in anti-knock agent concentration and a corresponding change in octane number:

$$\frac{d}{dL}O = b + 2cL + 3dL^2 + 4eL^3 \quad (2)$$

where $d/dL$ is the differential operator.

As an approximation then, the change in anti-knock agent concentration necessary to produce a given change in octane number of the blended fuel mixture may be expressed by the following relation:

$$\Delta L = \frac{\Delta O}{b + 2cL + 3dL^2 + 4eL^3} \quad (3)$$

were $\Delta L$ is the change in anti-knock concentration in cubic centimeters of TEL per gallon, for example, and $\Delta O$ is the change in octane number.

Accordingly, if a blended fuel is detected as being off-specification in octane number by an amount $\Delta O$, Relation 3 expresses the amount, $\Delta L$, by which the anti-knock agent concentration must be changed to bring the blend to specification.

Figures 3A, 3B, 5A:
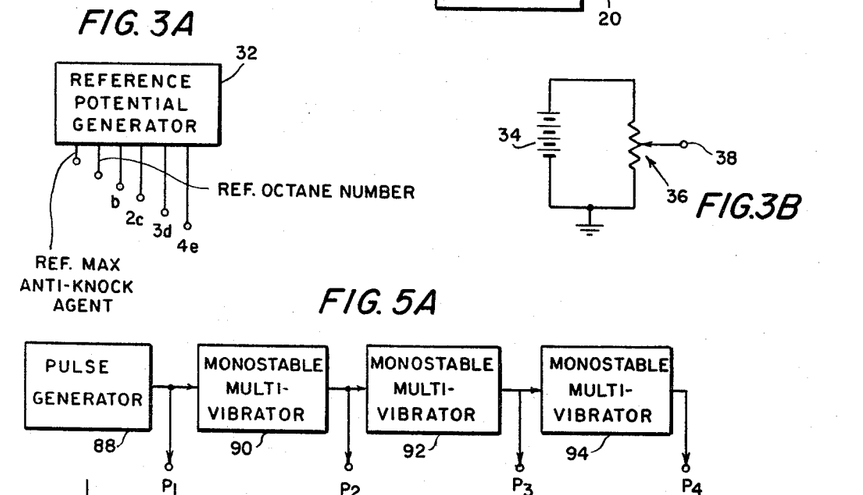
FIG. 3A illustrates schematically a reference potential generator useful in the computer shown in FIG. 2.
FIG. 3B is a detailed circuit diagram of a representative portion of the reference potential generator of FIG. 3A.
FIG. 5A is a block diagram of a pulse generating circuit useful with the computer of FIG. 2.

The circuit of FIG. 2 carries out the computations of Relation 3 to determine the amount of anti-knock agent that must be added to the blended fuel mixture in the blending tank 10 to correct for an octane number deviation. Referring to that figure, a signal from the octane number monitor 18 is applied to a subtracter or error-signal means 30. Also applied to the subtracter 30 is a reference signal representative of the octane number desired for the blended fuel. The reference signal is generated by a reference potential generator 32 (FIG. 3A), a representative circuit of which is shown in FIG. 3B. Specifically, a battery 34 supplies a potential to a potentiometer 36, the output signal from which appears at a terminal 38. Variation of the output signal, i.e., variation of the reference octane number, is achieved by suitable variation of the potentiometer.

Referring again to FIG. 2, the output signal from the subtracter 30 is representative of the factor $\Delta O$ in Relation 3, i.e., the deviation of the octane number of the gasoline in the blending tank 10 from that desired. This signal is applied to a correction-signal means or divider 40 which also has applied thereto a signal representative of the denominator of the fraction in Relation 3. This latter signal is developed as follows.

A signal from the tank gauge 22, representative of the total quantity of gasoline in the blending tank 10, is applied as one input to a divider 42. The remaining input to the divider is a signal from the educator meter 24, which is representative of the total amount of anti-knock agent that has been added to the fuel in the blending tank 10 from the source 28. Accordingly, the signal from the divider 42 is representative of $L$ in Relation 3, i.e., the amount of anti-knock agent per gallon, for example, in the blending tank 10, and this signal is applied through a linear gate 44 to a memory 46 wherein it is stored. The signal from the memory 46 is in turn applied to a modifying circuit 48 which is shown in detail in FIG. 4.

Figure 4:
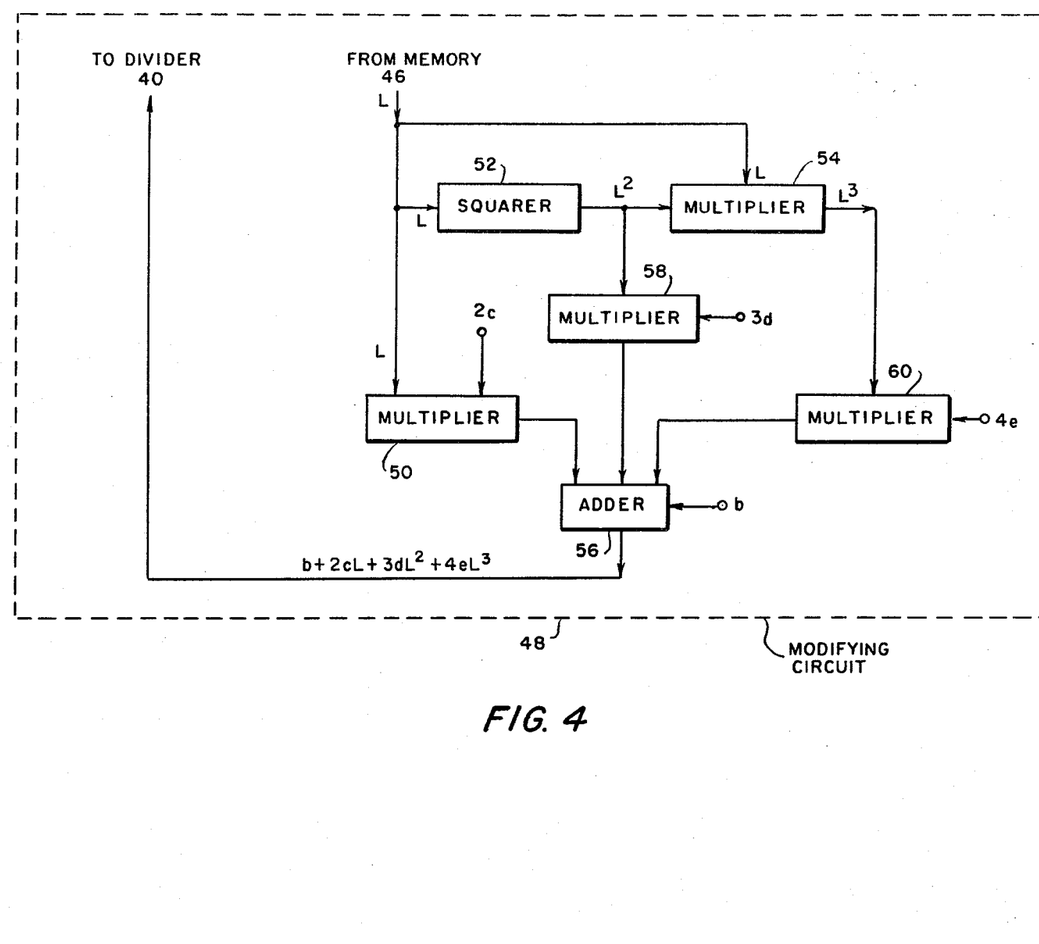
FIG. 4 is a detailed circuit diagram of a portion of the computer of FIG. 2.

Referring to FIG. 4, the signal from the memory 46 is applied to a multiplier 50, a squarer 52, and a multiplier 54. Also applied to the multiplier 50 is a signal representative of the quantity $2c$, which may be generated by the reference potential generator 32 of FIG. 3A. Accordingly, the output signal from the multiplier 50 is representative of the quantity $2cL$ which is applied as one of four inputs to an adder 56.

The signal ($L^2$) from the squarer 52 is applied to the multiplier 54 as well as to another multiplier 58. Also applied to the multiplier 58 is a signal representative of the quantity $3d$, which may be generated by the reference potential generator 32 of FIG. 3A. Accordingly, the signal from the multiplier 58 is representative of the quantity $3dL^2$, and this signal is applied to the adder 56.

The multiplier 54, which has applied thereto the signals representative of the quantities L and $L^2$, produces and output signal representative of the quantity $L^3$ which is applied to a multiplier 60. Also applied to the multiplier 60 is a signal from the reference potential generator 32 of FIG. 3A representative of the quantity $4e$. Accordingly, the signal from the multiplier 60 is representative of the quantity $4eL^3$, and this signal is applied to the adder 56.

The final input to the adder 56 is a signal representative of the quantity $b$, which may be generated by the reference potential generator 32 of FIG. 3A. Accordingly, the output signal from the adder 56 is representative of the quantity $b+2cL^2+3dL^2+4eL^3$, i.e., the denominator of the fraction in Relation 3, and this signal is applied from the adder 56 to the divider 40 of FIG. 2.

As may be noted, the signal from the divider 40 is representative of the fraction in Relation 3, i.e., the amount of anti-knock agent per gallon that must be added to the fuel mixture in the blending tank 10 to bring the fuel to octane number specification.

The signal from the divider 40 is applied to an attenuator 62, which may comprise a potentiometer, for example (not shown), which generates an output signal that is a predetermined fraction of the input signal. The attenuation is introduced at this point to ensure that the change effected in anti-knock agent concentration is slightly less than that theoretically required to bring the blend completely to octane number specification. In this fashion, positive protection is provided against exceeding a predetermined octane number specification by adding too much anti-knock agent at any particular time. Thus, deviations in octane number from specification are corrected in at least two or more steps, and costly quality give-away is avoided.

The signal from the attenuator 62 is applied through a linear gate 64 to a multiplier 66. Also applied to the multiplier is the signal from the tank gauge 22 representative of the total quantity of gasoline in the blending tank 10. Accordingly, the signal from the multiplier 66 is representative of the total amount of anti-knock agent, expressed in cubic centimeters, for example, that is to be added to the gasoline in the blending tank 10. This signal is applied to memory means such as a memory 68 wherein it is stored.

Control of the addition of anti-knock agent to the blending tank 10 in accordance with the signal from the memory 68 is effected as follows. A source of power from a power supply 70 (FIG. 2) is applied through a pair of switches 72 and 74, that are controlled by solenoids 76 and 78, respectively, to the anti-knock agent eductor 26. The switch 72 is normally closed, as shown in the figure, but the switch 74 is normally open. At the beginning of a control cycle, a pulse $P_4$, generated as described hereinafter, sets a bistable multivibrator 79 which in turn energizes the solenoid 78 and closes the switch 74. With the switches 72 and 74 both closed, the eductor 26 is activated, thereby adding anti-knock agent from the source 28 of FIG. 1 to the blending tank 10.

To limit the amount of anti-knock agent that is added to the blending tank 10 in accordance with the computed amount, the signal from the eductor meter 24, representative of the total amount of anti-knock agent that has been added to the blending tank, is applied through a linear gate 80 to a memory 81 as well as to a subtracter 82. The memory 81 is reset by a pulse $P_1$ at the beginning of each control cycle so that it is cleared of any previous signal stored therein. Following this, a pulse $P_2$ gates open the gate 80 to apply to the memory 81 for storage therein a signal from the meter 24 representative of the amount of anti-knock agent in the blending tank 10 at the beginning of the control cycle. This signal is applied from the memory 81 to the subtracter 82 which, accordingly, produces an output signal representative of the amount of anti-knock agent that is added to the blending tank 10 from the beginning of the control cycle.

The signal from the subtracter 82 is applied as one input to a comparator 84. Also applied to the comparator is a signal from the memory 68 representative of the total amount of anti-knock agent that is to be added to the blending tank 10. Accordingly, when the signal from the subtracter 82 is equal in magnitude to the signal from the memory 68, indicating that the predetermined amount of anti-knock agent has been added to the blending tank 10, the comparator 84 generates an output signal which resets the bistable multivibrator 79. This de-energizes the solenoid 78 and thus opens the switch 74, thereby de-activating the anti-knock agent eductor 26 and permitting no further flow of anti-knock agent to the blending tank 10.

Figure 5B:
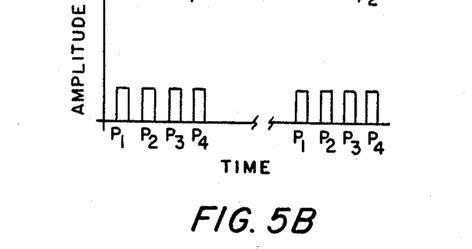
FIG. 5B is a waveform diagram showing the time relationship of the pulses produced by the pulse generating circuit of FIG. 5A.

To achieve the above-described control in a series of continuing control cycles, a group of sequential pulses $P_1$, $P_2$, $P_3$, and $P_4$, which occur at timed intervals as shown in FIG. 5B, is generated by a circuit such as that shown in FIG. 5A. Referring to that figure, a conventional pulse generator 88 emits the pulse $P_1$ at timed intervals. These intervals are each of such duration that, following a cycle, a complete intermixing of the contents of the tank 10 is ensured before the next cycle is initiated. The pulse $P_1$ triggers a monostable multivibrator 90 which generates the pulse $P_2$. The pulse $P_2$ in turn triggers a monostable multivibrator 92 which generates the pulse $P_3$. The pulse $P_3$ triggers a monostable multivibrator 94 which generates the pulse $P_4$.

As shown in FIG. 2, the pulse $P_1$ resets the memories 46 and 81 and clears them of any signals previously stored therein. The pulse $P_2$ is applied as a gating pulse to the gate 44 to gate into the memory 46 the signal from the divider 42 representative of the concentration of anti-knock agent in cubic centimeters per gallon, for example, in the blending tank 10 at the beginning of the cycle. The pulse $P_2$ is also applied to the gate 80 to gate the signal from the eductor meter 24 into the memory 81 as described above.

The pulse $P_3$ resets the memory 68 and clears it of any signal previously stored therein. The pulse $P_4$ gates open the linear gate 64 so that the signal from the attenuator 62 may be applied to the multiplier 66. The pulse $P_4$ also sets the bistable multivibrator 79 to energize the solenoid 78 and to close the switch 74, thereby activating the anti-knock agent eductor 26 and commencing the cycle of operations described above.

Rather than controlling the addition of anti-knock agent to the blending tank 10 in a series of control cycles that are spaced from each other by a fixed predetermined time as just described, each cycle may be initiated only after it is determined that the contents of the blending tank are completely intermixed following the previous cycle. This is accomplished by replacing the conventional pulse generator 88 of FIG. 5A by the circuit or control signal means shown in FIG. 6A.

Figure 6A:
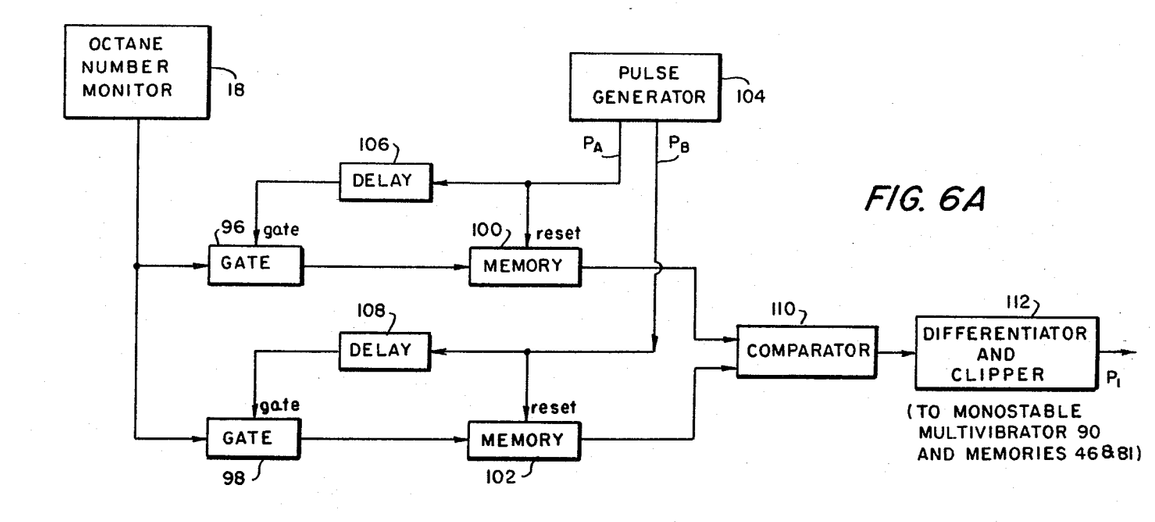
FIG. 6A is a block diagram of a control circuit useful in the system of FIG. 1 for initiating a control cycle only after a batch blended product is determined to be completely mixed.

Referring to FIG. 6A, the octane number monitor 18 is coupled to two linear gates 96 and 98, output signals from which are applied to memory or storage means such as memories 100 and 102, respectively. A pulse generator 104 generates a series of sequential and alternate pulses $P_A$ and $P_B$, shown in time in FIG. 6B. The pulses $P_A$ appear on a lead designated $P_A$, while the pulses $P_B$ appear on a lead designated $P_B$.

Each pulse $P_A$ serves to reset the memory 100 and clear it of any signal previously stored therein. In addition, each such pulse, after being delayed by a delay unit 106, gates open the gate 96 so that the signal then generated by the octane number monitor 18 is applied to and stored within the memory 100.

Similarly, each pulse $P_B$ serves to reset the memory 102 and, after a suitable delay in a delay unit 108, to gate open the gate 98 to pass the signal then generated by the octane number monitor 18 to the memory 102 wherein it is stored.

The signals from the memories 100 and 102 are applied to a comparator 110 which generates a signal only when the two input signals are substantially equal. The comparator 110 is coupled to a differentiator and clipper 112 which generates the pulse signal $P_1$ upon the generation of an output signal by the comparator 110. The signal from the differentiator and clipper 112 is applied to the monostable multivibrator 90 of FIG. 5A to initiate the generation of the pulses $P_2$, $P_3$, and $P_4$, as well as to the memories 46 and 81 of FIG. 2.

Figure 6B:
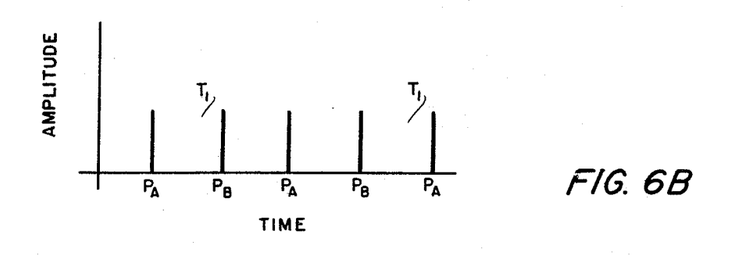
FIG. 6B is a waveform diagram showing the time relationship of pulses produced by a pulse generator used in the circuit of FIG. 6A.

The circuit of FIG. 6A operates as follows. The pulses $P_A$ and $P_B$ are generated sequentially and continuously, any two pulses being spaced in time from each other by a predetermined interval T, as shown in FIG. 6B, which may be roughly equivalent to the normal mixing time for the blending tank 10. The interval T, for example, may be 10 minutes; however, this is completely arbitrary and will vary with the nature of the blending operation.

The pulses $P_A$ and $P_B$ serve to gate into the memories 100 and 102, respectively, signals from the octane number monitor 18. Thus, at any instant, one of the memories 100 and 102 has stored therein a signal representative of the octane number of the gasoline in the blending tank 10 at a particular time, and the other one of the memories has stored therein a signal representative of the octane number in the blending tank at a time T minutes before the particular time. When the signals stored within the memories 100 and 102 are substantially equal, resulting in the generation of a signal from the comparator 110 and the pulse signal $P_1$ from the differentiator and clipper 112, the signals from the octane number monitor 18 have remained substantially unchanged for the predetermined interval of time T, which is indicative of a complete mixing of the contents of the blending tank 10.

As may be seen, then, the circuit of FIG. 6A operates to establish the control cycles in as rapid a sequence as possible, a cycle being initiated when the contents of the blending tank 10 are completely intermixed following the addition of anti-knock agent during the previous cycle.

The circuit of FIG. 2 also includes positive protection against the addition of a greater amount of anti-knock agent per unit quantity of gasoline in the blending tank 10 than a predetermined maximum. To this end, a signal from the divider 42, representative of the amount of anti-knock agent per unit quantity of gasoline, is applied as one input to inhibiting means such as a comparator 114. Also applied to the comparator is a signal from the reference potential generator 32 of FIG. 3A representative of the predetermined maximum concentration of anti-knock agent.

As long as the signal from the divider 42 does not exceed the reference signal, the comparator 114 is not actuated. If the signal from the divider 42 should exceed the reference signal, however, the comparator emits an output signal which is applied to a signaling device 116 to provide a visual or audible signal indicating that the amount of anti-knock agent concentration has exceeded the predetermined maximum magnitude.

In addition, the signal from the comparator 114 is applied to the solenoid 76 to energize the solenoid and to open the switch 72. In this fashion, the anti-knock agent eductor 26 is immediately de-energized, and no further anti-knock agent can be added to the blending tank 10.

Thus, there has been described an exemplary system for the batch blending of a fuel product. The product is continuously sampled and its octane number characteristic determined so that an anti-knock agent may be added to the blended mixture to bring it to octane number specification.

It will be understood by those skilled in the art that the above described embodiment is merely exemplary and that it is susceptible of modification and variation without departing from the spirit and scope of the invention. Accordingly, the invention is not to be deemed limited except as it is defined in the following claims.

We claim:
1. In apparatus for blending a gasoline in a batch blending operation wherein a plurality of fuel components are blended together in a blending tank, sensing means including a single cylinder automated knock test engine for sensing the octane number of the fuel in the blending tank to generate an octane number signal, error-signal means operatively associated with and responsive to the sensing means for generating an error signal representative of the deviation of the octane number signal from a predetermined reference, memory means operatively associated with the sensing means and operative at periodic intervals to store the octane number signal, control-signal means operatively associated with and responsive to the memory means for comparing successive stored octane number signals to generate a control signal when said successive stored octane number signals are substantially equal, and control means operatively associated with the control-signal means and rendered operative by the control signal for varying the amount of a component that is added to the blending tank in response to the error signal.

2. In apparatus for batch blending a fuel product formed from a plurality of component fuel products mixed together in a blending tank, monitoring means including a single cylinder automated knock test engine for monitoring the fuel in the blending tank to detect its octane number, error-signal means operatively associated with and responsive to the monitoring means for generating an error signal representative of the difference between the detected octane number and a predetermined reference, correction-signal means operatively associated with the error-signal means and responsive to the error signal for generating a correction signal representative of the amount of a predetermined component that must be added to the blending tank to correct for the deviation in octane number from the predetermined reference, control means operatively associated with the correction-signal means and responsive to the correction signal for adding the predetermined component to the blending tank to correct for the octane number deviation; means for detecting the amount of the predetermined component per unit quantity in the blending tank and generating a quantity signal in response thereto, and inhibiting means operatively associated with the detecting means and responsive to the quantity signal for inhibiting the addition of the predetermined component to the blending tank when the quantity signal exceeds a predetermined maximum magnitude.

3. In apparatus for blending motor fuels the combination comprising
   fluid blending means,
   component conduit means for introducing a plurality of motor fuel blending components into said blending means,
   an automated single cylinder internal combustion engine having a repetitive operating cycle, performing no useful work, operating under detonation conditions, and having means providing a signal output representative of the knocking propensity of the fuel powering the same,
   sample conduit means connecting said blending means and said engine,
   first and second signal storage means,
   means for alternatively directing said signal representative of knocking propensity to said first and second signal storage means,
   comparator means responsive to said first and second signal storage means, for generating a third signal, and control means, responsive to a function of said third signal, to modify the relative proportions of said components introduced from said component conduit means into said blending means.

4. A method for blending a motor fuel which comprises
flowing an anti-knock component of fuel to a blending means,
generating first signals representative of the flow of said component,
withdrawing a sample stream from the blending means,
flowing the sample stream to a single cylinder automated knock test engine for detonation therein,
generating successive signals representative of the knocking propensity of fuel in said engine,
storing said successive signals,
generating second signals from a comparator responsive to said stored successive signals,
generating signals from a computer responsive to said first and second signals to control said component flowed to said blending means.

References Cited

UNITED STATES PATENTS

| | | | |
|---|---|---|---|
| 2,306,372 | 12/1942 | Banks | 73—35 |
| 2,903,417 | 9/1959 | Beaugh et al. | 208—136 |
| 3,000,812 | 9/1961 | Boyd | 208—138 |
| 3,238,765 | 3/1966 | Beal | 73—35 |
| 3,312,102 | 4/1967 | Traver | 73—35 |

OTHER REFERENCES

ASTM Manual for Rating Fuels by Motor and Research Methods, fourth edition, 1960, pp. 43–55.

Butler, "Automatic Blending Lives Up to Goal," Petroleum Refiner, vol. 39, August 1960, pp. 97–100.

Sisk, "Automation for Gas Blending," Oil and Gas Journal, June 20, 1960, vol. 58, No. 2, pp. 108–111.

"The Use of Digital Computers in Petroleum Refining" by Hagler and Shea, from Advances in Petroleum Chemistry and Refining, by Kobe and McKetta, Interscience Publishers, vol. 5, copyright June 20, 1962, pp. 117 to 152.

"Data-Control-Special Purpose Computers in the Control of Continuous Processes" by Amber et al., from Automatic Control, vol. 7–8, May 1958, pp. 43 to 48.

DANIEL E. WYMAN, *Primary Examiner.*

PATRICK P. GARVIN, *Examiner.*

J. E. DEMPSEY, Y. H. SMITH, *Assistant Examiners.*

Disclaimer 3,383,190.—*Harry R. Weber*, Haddon Township, Camden County, and Herman F. Hoffmann, Wenonah, N.J. FUEL BLENDING SYSTEM. Patent dated May 14, 1968. Disclaimer filed Nov. 20, 1968, by the assignee, *Mobil Oil Corporation*.

Hereby disclaims the terminal portion of the term of the patent subsequent to March 8, 1983.

[*Official Gazette April 15, 1969.*]

UNITED STATES PATENT OFFICE
CERTIFICATE OF CORRECTION

Patent No. 3,383,190                      May 14, 1968

Harry R. Weber et al.

It is certified that error appears in the above identified patent and that said Letters Patent are hereby corrected as shown below:

Column 1, line 67, after "compares" insert -- it --; column 2, lines 66 and 69, for "full", each occurrence, read -- fuel --; same line 69, after "as" insert -- a --; column 4, line 54, for "educator" read -- eductor --; column 5, line 6, for "and" read -- an --.

Signed and sealed this 22nd day of July 1969.

(SEAL)
Attest:

Edward M. Fletcher, Jr.

Attesting Officer

WILLIAM E. SCHUYLER, JR.

Commissioner of Patents